BOUNDARY DISPLACEMENT MAGNETIC RECORDER AND PRINTER

Filed Sept. 6, 1961 4 Sheets-Sheet 1

INVENTOR.
Saburo Uemura
BY
Hill, Sherman, Meroni, Gross & Simpson
ATTORNEYS

BOUNDARY DISPLACEMENT MAGNETIC RECORDER AND PRINTER

INVENTOR.
Saburo Uemura
BY
Hill, Sherman, Meroni, Gross & Simpson
ATTORNEYS

BOUNDARY DISPLACEMENT MAGNETIC RECORDER AND PRINTER

Filed Sept. 6, 1961

INVENTOR.
Saburo Uemura
BY
Hill, Sherman, Meroni, Gross & Simpson
ATTORNEYS

BOUNDARY DISPLACEMENT MAGNETIC RECORDER AND PRINTER

Filed Sept. 6, 1961 4 Sheets-Sheet 4

INVENTOR.
Saburo Uemura
BY
Hill, Sherman, Meroni, Gross & Simpson
ATTORNEYS

United States Patent Office 3,248,719

Patented Apr. 26, 1966

3,248,719
BOUNDARY DISPLACEMENT MAGNETIC RECORDER AND PRINTER

Saburo Uemura, Tokyo, Japan, assignor to Sony Corporation, Tokyo, Japan, a corporation of Japan Filed Sept. 6, 1961, Ser. No. 136,224
Claims priority, application Japan, Sept. 10, 1960, 35/37,973, 35/37,974, 35/37,975, 35/37,976
1 Claim. (Cl. 340—174.1)

This invention relates to a magnetic recording and reproducing system and more particularly to a simple magnetic recording and reproducing system wherein magnetically recorded signals may be analyzed and wherein the magnetic records may provide a visible reproduction of the recorded signal, if desired.

One object of this invention is to provide a magnetic recording and reproducing system in which magnetic recording corresponding to desired signals is made and wherein their waveforms may be made visible.

Another object of this invention is to provide a simple analyzing system in which recorded signals may be analyzed from magnetic records.

Other objects, features and advantages of this invention will be fully apparent from the following description taken in connection with the accompanying drawings, in which.

Figure 1A:
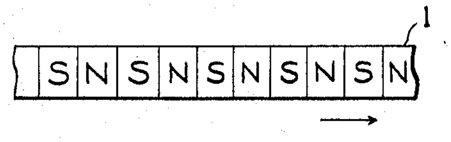
FIGURES 1A through 1D are a group of diagrammatic representations of magnetic mediums such as magnetic tapes which have been magnetized by different techniques.
Figure 1B:
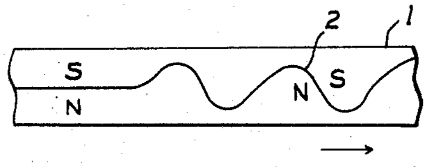

Various techniques have been employed in the past for making magnetic recordings on a magnetic medium. Perhaps the best known method is to varyingly magnetize a travelling magnetizable magnetic medium such as a tape which has been coated with a permanent magnet type powder material. Such a technique is illustrated schematically in FIG. 1A and the entire width of the tape 1 has been shown being magnetized first one way and then the other in a longitudinal direction, the letters S and N being used to denote a south pole and north pole orientation. Another magnetic recording technique is the so-called boundary displacement type method. In this method of recording the length of the tape is divided into two oppositely oriented portions. While signals are absent, the dividing line of the two portions lies in the center of the tape but this dividing line moves laterally in accordance with signals as a recording is being made. This is schematically shown by the boundary line 2 in FIG. 1B.

The boundary displacement type magnetic recording is a useful recording system from the standpoint that recorded signal waveforms may be made visible by sprinkling or painting magnetic powder on a recorded magnetic medium so as to locate the boundary line.

The present invention provides an analyzing system wherein signal waveforms may be made visible and analyzed through the use of an extremely simple and economical arrangement which is novel and distinctive.

Figure 2A:
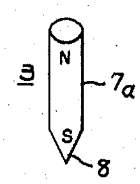
FIGURES 2A, 2B and 2C are diagrammatic views of a magnetic recording element in accordance with this invention.
Figure 2B:
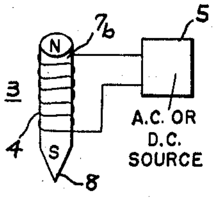
Figure 2C:
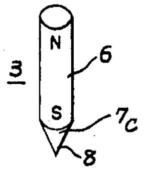

For a recording element, a pointed rod or needle-like magnet member 3 may be used such as shown in FIGS. 2A to 2C. This magnetic member 3 may be a very simple magnetized rod *7a* as shown in FIG. 2A, or it may be a member of relatively high permeability but low coercive force with an electric coil therearound such as is indicated at *7b* and 4 respectively in FIG. 2B.

In this form the coil 4 is connected either to a direct current source or an alternating current source as indicated at 5 in FIG. 2B. A third arrangement is to use a soft iron or the like pole piece 7C attached to a permanent magnet 6 as shown in FIG. 2C. One end of 8 of the magnet member assembly 3 at least should be relatively sharp.

Figure 1C:
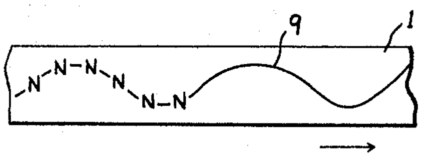
Figure 1D:
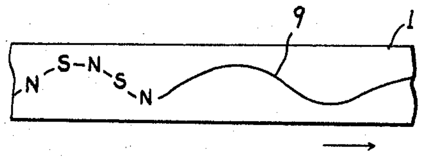

In making a recording on a magnetic medium, such as the tape 1 with a magnetic recording element 3 as above described, the tape 1 is moved in a longitudinal direction and the magnetic recording element 3 is moved laterally corresponding to the signals to be recorded. The tip 8 of the element 3 then describes a path corresponding to the signal waveform as schematically shown at 9 in FIG. 1C and FIG. 1D. If the pole tip 8 is magnetized, for instance, as a south pole such as would be the case if a head assembly as shown in FIG. 2A or FIG. 2C were used, a trace would be obtained such as shown at 9 in FIG. 1C. If the head is alternately magnetized as first a north and then south pole as would be the case if the coil 4 of FIG. 2B were energized with alternating current, a trace 9 as shown in FIG. 1D would result.

Figure 12:
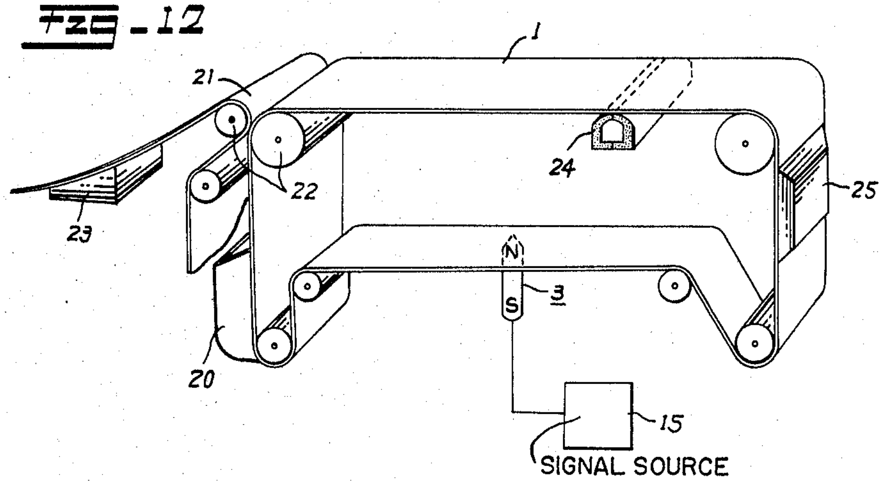
FIGURE 12 is a diagrammatic view of one form of system in which a magnetically recorded signal is made visible.

A visual indication of the location of the magnetic trace 9 may be provided by apparatus such as is schematically shown in FIG. 12.

As there shown there is disposed immediately following the element 3 an iron powder dusting unit 20. The magnetic tape 1 is shown by way of example as an endless belt. Iron powder deposited thereon by the dusting unit 20 is transferred to a wax paper tape 21 by means of pressure rollers 22, and is thereafter fixed thereto by a heater 23. An erase head 24 is located adjacent the tape 1 after the pressure rollers 22 and ahead of a brush and vacuum cleaner 25, which in turn lies ahead of the recording head assembly 3. Thus, magnetic powder is sprinkled or painted on the recorded magnetic medium 1 so as to be attached along the waveform 9 and thereafter the waveform is reproduced as a visual trace.

If the magnetic recording element 3 is formed so that its diameter is 0.3 mm., its length is 3 mm. and the curvature of its tip 8 is 0.1–0.025 mm., a very fine clear track is given. With an arrangement such as this, it will be apparent that a recording may be made by manually moving the element 3 as well as driving it electrically. Thus figures, characters and the like may be recorded by manual manipulation.

Figure 8:
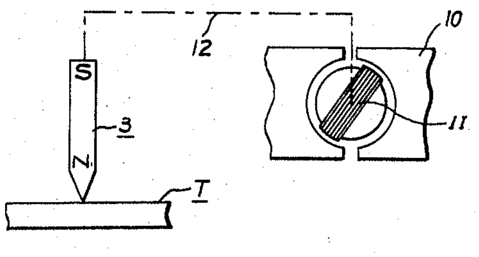
FIGURE 8 is a schematic diagram illustrating one example wherein a magnetic recording element according to this invention is mounted on the movable part of a moving coil type of electric meter and wherein the magnetic recording is made in accordance with the angular movement of the moving coil.

FIG. 8 illustrates an arrangement in which the recording element 3 is mechanically coupled to an arm 12 of a moving coil 11 disposed in an air gap of a core 10 of a meter. In this case, if the magnetic tape T is transferred at a constant speed, recording such as shown by a curve R in FIG. 3 is traced on the magnetic medium T by the element 3 in accordance with the angular movement of the moving coil 11.

Figure 3:
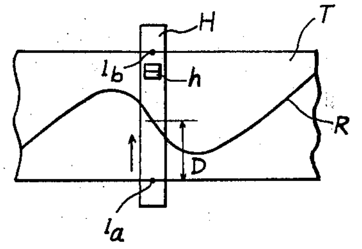
FIGURE 3 is a front diagrammatic view of a device for analyzing a magnetic record upon which a recording has been made in accordance with this invention.
Figure 4:
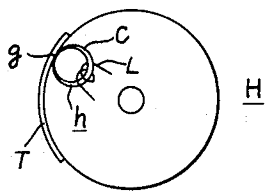
FIGURE 4 is a side view of the device shown in FIG. 3.

FIGS. 3 and 4 illustrate, by way of example, a device for detecting and reproducing the signal waveform R produced by the apparatus of FIG. 8. More specifically, a rotary magnetic head assembly H is used which is provided with a magnetic head *h*. The magnetic head *h* comprises a coil L wound on a magnetic core C. A small narrow air gap *g* is formed by the pair of opposite magnetic poles of the core C. Scanning is made transversely with respect to the longitudinal direction of the tape.

In this example the magnetic head produces pulse output signals depending upon the point where the head gap intersects the signal trace. In accordance with this invention, a signal is reproduced which is a function of the distance which the trace lies from one edge or the other of the tape and each instant of time. Thus the reference point may be either the edge 1*a* or 1*b* of the tape T.

Figure 5:
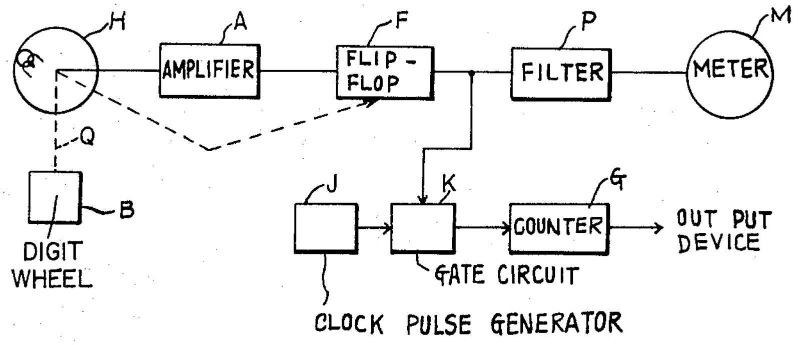
FIGURE 5 is a block diagram illustrating an embodiment of a circuit for analyzing the magnetic recorded signals.
Figures 6A, 6B, 6C, 6D:
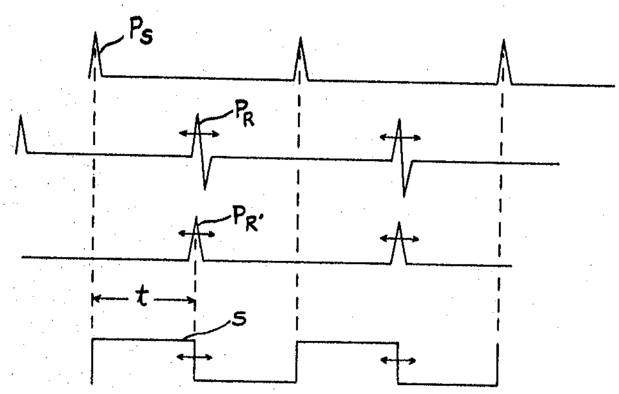
FIGURES 6A to 6D show curves for explaining the circuit shown in FIG. 5.

The coil L of the head assembly H is connected to an electric detection device as diagrammatically shown in FIG. 5. More specifically as shown in FIG. 3 the edge 1*a* is the reference point and the trace R at this instant lies at a distance D from this reference point. To this end, the magnetic tape T has relative movement across the periphery of a rotary drum of the magnetic head assembly H in a direction parallel to the axis of rotation of the drum. An amplifier A is arranged and connected to the output side of the magnetic head *h* and its output is fed to a conventional flip-flop circuit F. In this case, the flip-flop circuit is associated with the magnetic head *h* mechanically or electrically and is set when the magnetic head *h* arrives at the edge 1*a* of the tape T. When the magnetic head intersects the signal trace R a pulse signal is applied to the flip-flop circuit F. FIG. 6A shows a set pulse $P_s$ which is applied to the flip-flop circuit F when the magnetic head *h* arrives at the reference point or edge 1*a* and FIG. 6B illustrates the reset pulse $P_R$ produced by the magnetic head *h* as it reaches the trace R. It must be noted that the reset pulse must be taken out as a unidirectional pulse $P_R'$ as shown in FIG. 6C since the reset pulse $P_R$ is picked up as pulses having both the positive and negative parts. From the output of the flip-flop circuit F there may be obtained a pulse modulated signal S such as shown in FIG. 6D whose duration *t* is a function of the distance D between the reference edge 1*a* and the signal trace.

This output signal is fed directly to a meter M by which the amplitude of the signal can be read from its average current. When the magnetic head *h* scans the relative position of the signal waveform repeatedly, the repeating frequency to be produced in this case is eliminated by a filter P and the signal is integrated, by which the amplitude of the signal can be read by the meter M. Furthermore, at the output end of the flip-flop circuit F there is provided a counter G connected to a clock pulse generator J and a gate circuit K whereby the pulse width modulating output may also be digitally converted. A rotary shaft or a driving mechanism digit wheel B is connected to the head assembly H as indicated in FIGURE 5 by the dash line Q and the digit wheel is so controlled by the head output as to revolve for the time duration *t* as above described, by which the amplitude of the signal may be expressed directly in number form and further the number may be printed. A digital wheel for generating successive numbers in successive angular positions thereof is disclosed in an article in the Bell Laboratories Record for April 1954, pages 126–131, the article being entitled "A Digital Code Wheel." Moreover to the rotary shaft or the driving mechanism of the head is connected a code plate whereby the amplitude of the signal may be read digitally for the same time duration *t* as above described.

The above description has been made in connection mainly with the case wherein the tape is at a standstill, but as for a tape travelling at a constant speed, a rotary drum or a driving mechanism is likewise operated in contact with the tape to effect the lateral scanning across the width of the tape, whereby the signal waveform is sampled and can be read and recorded. In the above description, I have explained the case in which the signal is analyzed by moving the magnetic head *h* in the transverse direction with respect to the time axis, but when the original recorded signal is drawn in a circular arc the magnetic head *h* is required to scan in the same circular arc.

This invention has a great advantage that recorded signals on a medium may be read as a current or numeral by a simply constructed magnetic recording element and their waveform analysis may easily be made as above described.

This invention has a great advantage that recorded signals on a medium may be read as a current or numeral by a simply constructed magnetic recording element and their waveform analysis may easily be made as above described.

Figure 7:
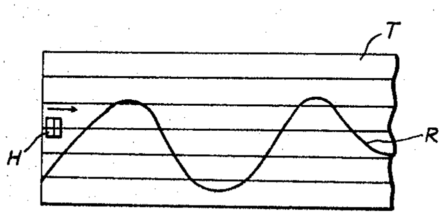
FIGURE 7 is a diagram illustrating another example of the magnetic recording and reproducing system of this invention.

In the above description I have explained the cases wherein signals are reproduced by contacting the rotary magnetic head on the magnetic medium transversely with respect to its longitudinal directions, but by moving the magnetic head or magnetic medium relatively with the magnetic head assembly H in contact with the magnetic medium in its longitudinal direction or parallel direction to the time axis as shown in FIG. 7, the number of the pulse on each level of the signal waveform is counted or the time until the magnetic head intersects the signal wave form is measured, whereby the signal waveform can be read.

In this invention the reproduction of the signals may be effected in the longitudinal direction or the parallel direction as above described and in any other desired direction.

The above description has been made in connection with the reproduction with the magnetic head in use, but the pulse may be reproduced by using an element of the same shape as the very simple magnetic recording and reproducing element detailed at the beginning of the specification, especially the magnetic rod provided with the coil 4 as shown in FIG. 2B.

In order to make visible the signals recorded on the magnetic medium as above described magnetic powder is sprinkled or painted on the magnetic medium so as to attach on the track only, whereby the recorded line 9 may be developed visible. One means for accomplishing this is to deposit magnetic powder on the magnetic medium by causing the medium to run through magnetic powder or by immersing the medium in a bath in which a suspension of the magnetic powder is stored.

Figure 9:
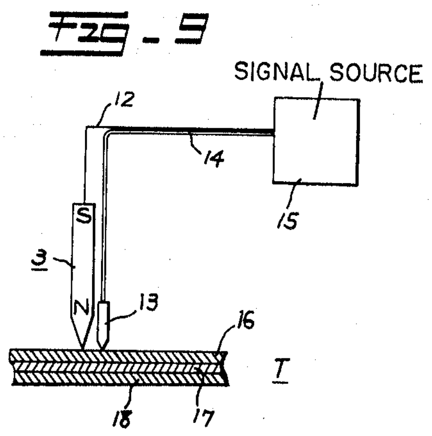
FIGURE 9 is a schematic diagram of a device wherein an ink recording pen is attached to the magnetic recording element and visible records are drawn at the same time that a magnetic record is being made.

As a visible recording element, there may be used an ink pen, a heat pen or the like similar to those employed in various conventional indicating instruments. In FIG. 9, an ink pen 13 is attached on the magnetic recording element 3 so as to vibrate or move integrally therewith. That is, 14 is a lever connected to a signal source 15 and ink is supplied to the nozzle of an ink pen 13 through a tube provided along the lever or through the lever itself if it is made as a tubular member. Also in case of using a heat pen, the tube provided along the lever 14 or the lever may be connected to a heat source. For a record paper, the above mentioned magnetic medium T may be used when the ink pen is employed. By way of example on the magnetic film layer of the magnetic medium is secured a paper layer 16 which can be inked. Another way is to cause the inking to be made on the paper 16 or a base 17 such as plastics by a visible recording element 13 in conjunction with the recording element 3. The magnetic film layer 18 may be magnetized by the element 3 through the paper 16 and the base 17.

When a heat pen is used, there is formed on the magnetic film layer a meltable material or a thermoplastic resin layer or a wax such as paraffin or the like. Visible waveforms are recorded by the heat pen at the same time that a magnetic recording is being made. In this case, the heat pen dissolves the paraffin or wax and forms grooves by which the visible waveforms appear. The heat pen may form creases on the resin layer or a chemical reaction is produced by heat so as to change the absorption of light, whereby the waveforms become visible.

Figure 13:
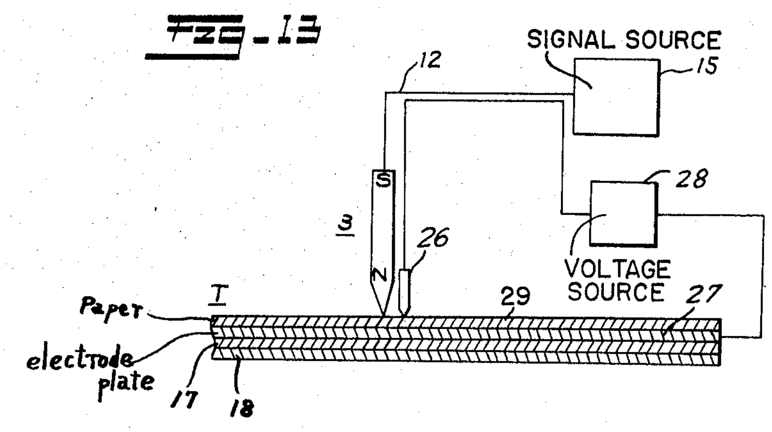
FIGURE 13 is a diagrammatic view of another form of the present inventions.

In another embodiment indicated in FIGURE 13, there is attached to the magnetic recording element a discharge electrode 26 and below the magnetic medium there is provided an electrode plate 27 on which a metallic thin film is formed through an insulating film. A discharge occurs between the discharge electrode 26 and the electrode plate 27 by virtue of an applied voltage from source 28 thereby breaking the insulating paper 29 or the thin film and achieving the visible recording and magnetic recording at the same time.

Furthermore, in another form, on the magnetic recording element there is provided an electrode, and on the magnetic medium there is also provided an electrode, on which, in turn, there is formed a layer which will have an electro-chemical reaction, such as potassium iodide when a current passes therethrough. With this arrangement the light absorption ratio is changed so that the visible waveforms may be noted.

Figures 10, 11:
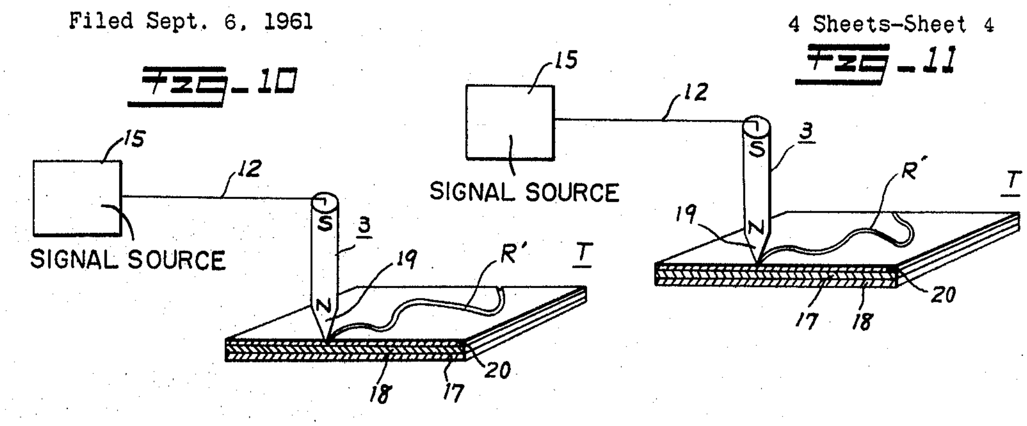
FIGURE 10 is a schematic diagram illustrating, by way of example, a combination magnetic and visible recording system according to this invention.
FIGURE 11 is a schematic diagram illustrating another example of a combination magnetic and visible recording system according to this invention.

FIG. 10 illustrates an example wherein at the tip of the recording element 3 is formed a sharp point 19 and on the magnetic medium layer 18 on the base 17 is formed a paraffin or wax or resin layer 20 or the like which may be scraped off mechanically by point 19 to form a record. In this example, when the recording element 3, is connected to the signal source with the arm 12 and is vibrated in accordance with signals the recording element effects the magnetic recording on the magnetic medium 18, at the same time that it makes a visible recording on the layer 20 by scraping out a groove like a record disc.

In FIG. 11, the record paper is formed by forming the magnetic medium layer 18 on one surface of the base 17 and providing a layer 20 on the other face upon which the visible recording is made by a recording element in contact therewith in such a way as to cut into it. The magnetic recording is made on the magnetic medium 18 through the base 17 at the same time.

It will be apparent that many modifications and variations may be effected without departing from the scope of the novel concepts of this invention.

What is claimed is:

A magnetic and visible recording device comprising a magnetic medium including a magnetic member and a paper laminated to said member, a magnet member provided with a sharp magnetic pole facing said magnetic medium, a pen device which is mounted integrally with said magnet member and, means for moving said magnet member and said pen device mounted integrally therewith to perform the magnetic recording on the magnetic medium and for drawing a visible line on said paper in accordance with input signals.

References Cited by the Examiner

UNITED STATES PATENTS

| | | | |
|---|---|---|---|
| 2,677,728 | 5/1954 | Kolb et al. | 346—74 |
| 2,932,278 | 4/1960 | Sims | 346—74 |
| 2,943,908 | 7/1960 | Hanna | 346—74 |
| 2,996,575 | 8/1961 | Sims | 346—74 |

IRVING L. SRAGOW, *Primary Examiner.*